United States Patent
Lylon et al.

(10) Patent No.: US 9,838,647 B2
(45) Date of Patent: Dec. 5, 2017

(54) DEVICE FOR USE IN A DIGITAL CONFERENCE SYSTEM

(75) Inventors: Carl Lylon, Izegem (BE); Patrick Talloen, Bredene (BE); Davy Vantomme, Moorslede (BE)

(73) Assignee: TELEVIC CONFERENCE NV, Izegem (BE)

( * ) Notice: Subject to any disclaimer, the term of this patent is extended or adjusted under 35 U.S.C. 154(b) by 148 days.

(21) Appl. No.: 13/819,492

(22) PCT Filed: Jun. 21, 2011

(86) PCT No.: PCT/EP2011/060294
§ 371 (c)(1),
(2), (4) Date: Feb. 27, 2013

(87) PCT Pub. No.: WO2012/025277
PCT Pub. Date: Mar. 1, 2012

(65) Prior Publication Data
US 2013/0163411 A1    Jun. 27, 2013

(30) Foreign Application Priority Data

Aug. 27, 2010 (EP) .................................... 10174392

(51) Int. Cl.
*H04L 12/24* (2006.01)
*H04N 7/15* (2006.01)
(Continued)

(52) U.S. Cl.
CPC ......... *H04N 7/152* (2013.01); *H04L 12/1813* (2013.01); *H04L 29/06414* (2013.01);
(Continued)

(58) Field of Classification Search
CPC ............... H04L 45/25; H04L 29/06414; H04L 21/1813; H04L 45/28; H04L 67/12;
(Continued)

(56) References Cited

U.S. PATENT DOCUMENTS 4,442,502 A    4/1984  Friend et al.
5,537,142 A *  7/1996  Fenouil ................. H04N 7/148
                                                   348/14.11
(Continued)

FOREIGN PATENT DOCUMENTS

EP    1 717 978 A1    11/2006
EP       1874094 A1 *  1/2008  ............. H04R 27/00
(Continued)

OTHER PUBLICATIONS

TCS5500 eng.pdf, from archived web page, Televic.com, Nov. 19, 2006, pp. 1-8, plus first page of .pdf showing web archive page.*
(Continued)

*Primary Examiner* — Charles C Jiang
*Assistant Examiner* — Rose Clark
(74) *Attorney, Agent, or Firm* — Bacon & Thomas, PLLC (57) ABSTRACT

A device for use in a digital conference system has a first and a second port in connection with each other and has a configuration device for configuring, on receipt of a trigger signal, either the first or the second port as input port of the device and the other port as output port. The trigger signal is a synchronization signal. The device is preferably a delegate unit or an extension unit.

17 Claims, 9 Drawing Sheets

(51) Int. Cl.
*H04L 29/06* (2006.01)
*H04L 12/18* (2006.01)
*H04M 3/56* (2006.01)

(52) U.S. Cl.
CPC ...... *H04L 41/0668* (2013.01); *H04L 41/0816* (2013.01); *H04M 3/567* (2013.01)

(58) Field of Classification Search
CPC ............. H04L 2012/4028; H04L 69/40; H04L 65/4076; H04L 65/1093; H04L 65/4038; H04L 65/403; H04L 12/1854; H04L 12/18; H04L 29/06176; H04L 41/0816; H04L 29/0641; H04L 41/0668; H04M 3/561; H04M 3/567; H04M 3/568; H04M 3/56; H04N 7/15; H04N 21/2146; H04N 7/18; H04N 21/41422; H04N 21/2668; H04N 7/152; B64D 11/0015; H04H 60/00; H04H 20/00
USPC ...... 370/260, 263, 221, 216; 725/76, 77, 75, 725/74, 78, 87, 105, 106, 112, 113, 115, 725/149, 23, 28, 71, 80, 81, 92; 455/3.06, 431; 701/3; 709/217; 381/77, 381/86
See application file for complete search history.

(56) References Cited

U.S. PATENT DOCUMENTS

| | | | |
|---|---|---|---|
| 5,930,237 | A | 7/1999 | Horiuchi et al. |
| 6,577,605 | B1* | 6/2003 | Dagate ............. H04L 29/06027 370/270 |
| 2002/0024591 | A1* | 2/2002 | Fenouil ................ H04L 49/101 348/14.09 |
| 2003/0221195 | A1* | 11/2003 | Bizet ...................... H04N 7/106 725/78 |
| 2004/0237107 | A1* | 11/2004 | Staples ............. H04L 29/06027 725/47 |
| 2005/0071440 | A1* | 3/2005 | Jones et al. ................. 709/218 |
| 2006/0174285 | A1* | 8/2006 | Brady et al. ..................... 725/76 |
| 2006/0277589 | A1* | 12/2006 | Margis ................... H04H 20/62 725/135 |
| 2006/0293190 | A1* | 12/2006 | Watson et al. ................ 505/126 |
| 2007/0137988 | A1* | 6/2007 | Yu .......................... G06F 3/14 200/4 |
| 2007/0186174 | A1* | 8/2007 | Horikiri ................ G06Q 10/06 715/753 |
| 2007/0285504 | A1* | 12/2007 | Hesse ........................ 348/14.08 |
| 2008/0069011 | A1* | 3/2008 | Sekaran et al. ............... 370/260 |
| 2009/0034540 | A1* | 2/2009 | Law ..................... H04L 12/462 370/400 |
| 2009/0049498 | A1* | 2/2009 | Li ........................... G09G 5/006 725/127 |
| 2009/0052643 | A1* | 2/2009 | Hupp ..................... H04R 27/00 379/93.21 |
| 2010/0085417 | A1 | 4/2010 | Satyanarayanan et al. |
| 2010/0115326 | A1 | 5/2010 | Westeroth |
| 2010/0171883 | A1* | 7/2010 | Elliott .................... G09G 5/006 348/642 |
| 2011/0107377 | A1* | 5/2011 | Petrisor ............. H04L 12/40182 725/76 |
| 2011/0231545 | A1 | 9/2011 | Enomoto et al. |
| 2012/0013705 | A1* | 1/2012 | Taylor ................ H04L 12/1818 348/14.08 |

FOREIGN PATENT DOCUMENTS

| | | |
|---|---|---|
| JP | H11-074884 A | 3/1999 |
| JP | 2003-102070 A | 4/2003 |
| JP | 2005-101803 A | 4/2005 |
| JP | 2008-72419 A | 3/2008 |
| JP | 2008-519504 A | 6/2008 |
| JP | 2008-547296 A | 12/2008 |
| KR | 10-2009-0066588 A | 6/2009 |
| WO | 2006/065381 A2 | 6/2006 |
| WO | 2010/064532 A1 | 6/2010 |

OTHER PUBLICATIONS

International Search Report for PCT/EP2011/060294, Oct. 6, 2011.
Japanese Office Action dated Feb. 3, 2015 for JP 2013-526375, and English translation thereof.
Japanese Office Action dated Nov. 17, 2015 for JP 2013-526375, and English translation thereof.

* cited by examiner

DEVICE FOR USE IN A DIGITAL CONFERENCE SYSTEM

FIELD OF THE INVENTION

The present invention generally relates to the field of digital conference systems comprising a central unit and a plurality of delegate units connectable to the central unit.

BACKGROUND OF THE INVENTION

Figure 1:
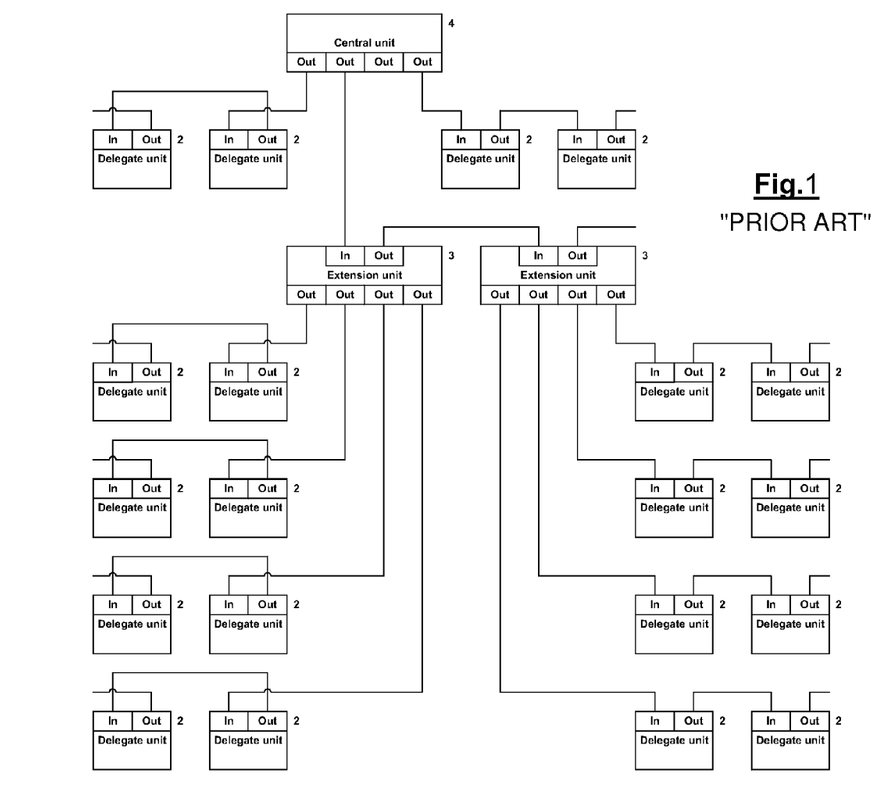
FIG. 1 illustrates a typical set-up of a prior art digital conference system.
Figure 2A:
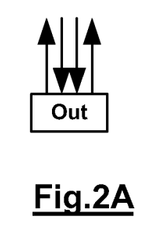
Figure 2B:
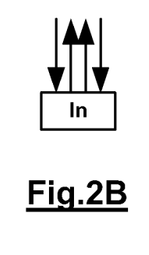

A conference system includes a central unit in connection with several delegate units for the participating delegates. The central unit serves to combine audio channels from various delegate units and to distribute the received audio and data channel and combinations of these channels. In the prior art solutions these delegate units are connected to the processing means of the central unit in a daisy chain way. Each central unit has a number of ports to which branches of delegate units can be connected. Optionally one or more extension units are provided to extend the amount of branches of delegate units in the conference system. FIG. 1 illustrates a typical set-up as known in the art. Every delegate unit in the system has two ports, an OUT port and an IN port, typically implemented with differential lines. The OUT port can be represented as an external transmit pair and an internal receive pair (see FIG. 2A) and the IN port as an external receive pair and an external transmit pair (see FIG. 2B). Note however that external or internal pair only constitutes a possible representation. Every IN port should be connected to an OUT port.

Given this conventional set-up the following problems can occur. During the installation of the system, a wrong connection can be made by connecting two IN ports or two OUT ports with each other. The cabling from left to right or right to left is different or the cables can cross each other.

As delay sensitive information signals such as audio and video signals are to be transported over the network, the interconnected units of the conference system must be synchronized. By achieving a synchronized network the data handling at each sub system is minimized, which e.g. avoids the need to resample the data.

Patent document U.S. Pat. No. 5,930,237 discloses a video conference system with ATM cell reuse. The video conferencing terminals are arranged in a daisy chain with the head of chain terminal connected to the ATM network. Each terminal has a video program input port with a unique ATM address and a plurality of video program output ports, each provisioned with one of the video program input port addresses.

Patent application EP1717978 A1 is concerned with time synchronisation, deterministic data delivery and redundancy for cascaded nodes on full duplex Ethernet networks. The proposed solution allows precisely synchronizing clocks in separate nodes on a communication network by adjusting timestamps and related data in network messages. Daisy chain connection of the nodes can be established. Redundancy is provided by extending the daisy chain to a ring topology. A supervisory device is then provided that has one master clock with two specialized ports and a specialized signalling protocol for obtaining redundancy. During normal operation, the supervisory device monitors traffic by sending special packets. Simultaneously, the supervisory device and end nodes monitor link status of their ports periodically and the end nodes notify the supervisory device in case of failure of a port through other port. When the supervisory device detects or is notified of a network failure, it broadcasts this status to all nodes through two different messages on its two ports. Hence, in this disclosure a failure is detected or notified via a central supervisory device.

U.S. Pat. No. 4,442,502 relates to a digital information switching system in the form of a family of information switching exchanges for effecting the connections from person to computer and from computer to computer within the business office. The proposed solution allows to add and to change in an easy way both telephone instrument features and system features by changing system table entries or the addition of software modules. Automatic detection of device failures maintains the system in operation at all times. Thanks to immediate automatic notification of occurrence of faults, faulty devices or components can be immediately replaced.

Aims of the Invention

The present invention aims to provide a device for use in a digital conference system wherein the above-mentioned problems of the prior art are avoided or overcome.

SUMMARY

The present invention relates to a device for use in a digital conference system, the device unit having a first and a second port in connection with each other. The device comprises configuration means for configuring, on receipt of a trigger signal, either the first or the second port as input port and the other port as output port of the device. Said trigger signal is thereby a synchronisation signal.

The proposed solution allows the selection of an active link on one port. The port selection occurs in an 'automatic' way. On receipt of the trigger signal the configuration of one of the ports of the delegate unit is triggered. Cabling errors between IN and OUT ports can so be avoided. It is to be noted that the synchronisation signal can be obtained in various ways, e.g. via a serial data stream or derived from periodically transmitted data packets.

As already mentioned the trigger signal is a synchronisation signal. In an advantageous embodiment it is a bit synchronisation signal.

In a preferred embodiment the device is a delegate unit. In an alternative embodiment the device is an extension unit to which additional delegate units can be connected.

In another aspect the invention also relates to a digital conference system comprising a plurality of devices as previously described arranged in a daisy chain topology and at least one central unit.

Advantageously, the digital conference system further comprises a network monitoring module arranged for polling the plurality of devices.

In a preferred embodiment the at least one central unit of the digital conference system is arranged for polling the network monitoring module.

The digital conference system preferably also comprises storage means for storing configuration information.

In a second aspect the invention relates to a method for obtaining redundancy in a digital conference system whereby said digital conference system comprises at least one central unit and a plurality of devices in a daisy chain topology, each of the devices comprising a first and a second port in connection with each other and configuring means for configuring either the first or the second port as input port of the device and the other port as output port. The method comprises the steps of:

creating an active network branch connecting a set of devices, optionally all devices, of the digital conference system, when a failure in the digital conference system is detected, making an output port of at least the device at an end of the active branch act as input port by sending a trigger signal, said trigger signal being a synchronisation signal.

It is to be noted that the output port of the device at an end of the active branch is made to act as an input port and that devices located between the end of the active branch and the location of the failure, if there are any, also make their outport port act as input port.

In another aspect the invention relates to a method for replacing a device (e.g. a delegate unit or extension unit) of a digital conference system, said digital conference system being configured as a network comprising a plurality of devices arranged in a daisy chain topology and a central unit. The method comprises the steps of:

detecting loss of a device of the digital conference system,
replacing the device by a replacement device,
detecting the replacement device in the digital conference system,
configuring via the central unit the detected replacement device with configuration settings of the lost device by means of a trigger signal, said trigger signal being a synchronisation signal.

Loss of a device may for example occur because of a cable failure or a network distribution failure.

BRIEF DESCRIPTION OF THE DRAWINGS

FIG. 2 illustrates a representation of an OUT port (FIG. 2A) and of an IN port (FIG. 2B).

DETAILED DESCRIPTION OF THE INVENTION

In one aspect the present invention relates to a device for use in a conference system provided with an automatic port selection mechanism allowing to select an active link on one of the device's ports. The device can, for example, be a delegate unit or an extension unit. As this mechanism can be employed not only at start-up but also at run-time it contributes in adding increased network redundancy in the interconnection between the multiple slaves (i.e. units of the conference system, like the delegate units and/or extension units) and a central unit of the conference system. Hence, an increased network redundancy is achieved. By exploiting the solution according to the present invention a cable failure in the network will lead to a redistribution of the active links in the network without losing connection from any device of the system to the central unit. Moreover, the failures that can be tolerated are not limited to cable failures. Also unit failures, network distribution failures or central unit-device failures can be tolerated with a smart cabling.

By introducing into the device (e.g. delegate unit) the means for automatic port type detection and configuration as in this invention, the unit will first look which port is an IN port. Next, the other port will be configured as an OUT port. Detecting which port is the IN port and which the OUT port is done by synchronizing onto the network.

A port has two pairs of differential lines. The IN port is displayed as an external differential receive pair and an internal differential transmit pair (external or internal pair is only a possible representation). The OUT port has just the opposite pairs.

Synchronization on the network implies that the unit sees the correct data at the correct time. Due to the synchronization, the processing in the units is minimized (no audio resampling, audio-video synchronization, . . . ). In the considered digital conference system bit synchronization is preferably applied, whereby each synchronized device has the same clock, thus making the data handling extremely easy. Bit synchronization means that each device has almost the same clock if clock jitter is left aside.

Figure 3:
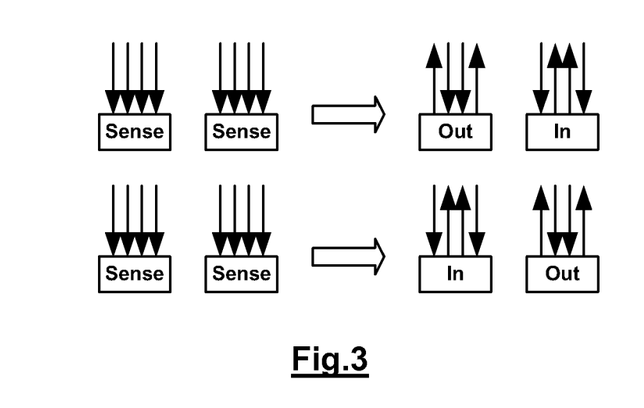
FIG. 3 illustrates the operation of the automatic port type detection.

At start-up, the central unit activates its OUT ports. At start-up or loss of network, the delegate units configure all their network ports in receive mode (SENSE). During this time, all the delegates units try to find the network on the external pair. This can be done sequentially (first left port, then right port, then left port, . . . ) or concurrently (both ports at the same time) until one port is synchronized on the network. From this moment on, the delegate unit knows which port is IN and which OUT and configures the ports accordingly. FIG. 3 illustrates the automatic port type detection with the sensing phase and the subsequent configuration as IN and OUT port, respectively. In this way the network is built up gradually. First the closest delegate units configure their ports, then the next closest delegate units, . . . until the last delegate unit has configured its ports. In other words, the delegate units are arranged in a daisy chain topology.

Figure 4:
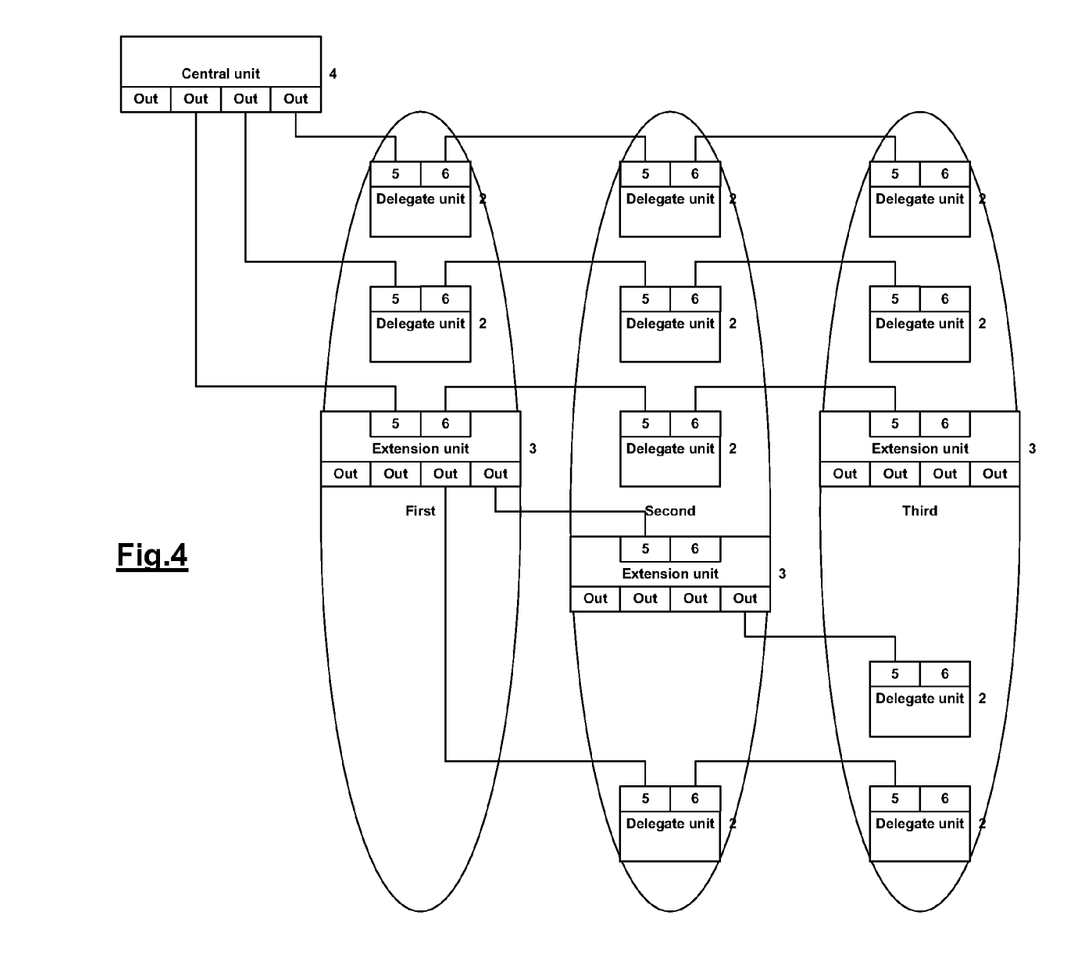
FIG. 4 illustrates a set-up with an extension unit.

Optionally, an extension unit can be integrated, as illustrated in FIG. 4. As long as the network is not detected, all the dedicated OUT ports of the extension unit are in receive mode.

Figure 5:
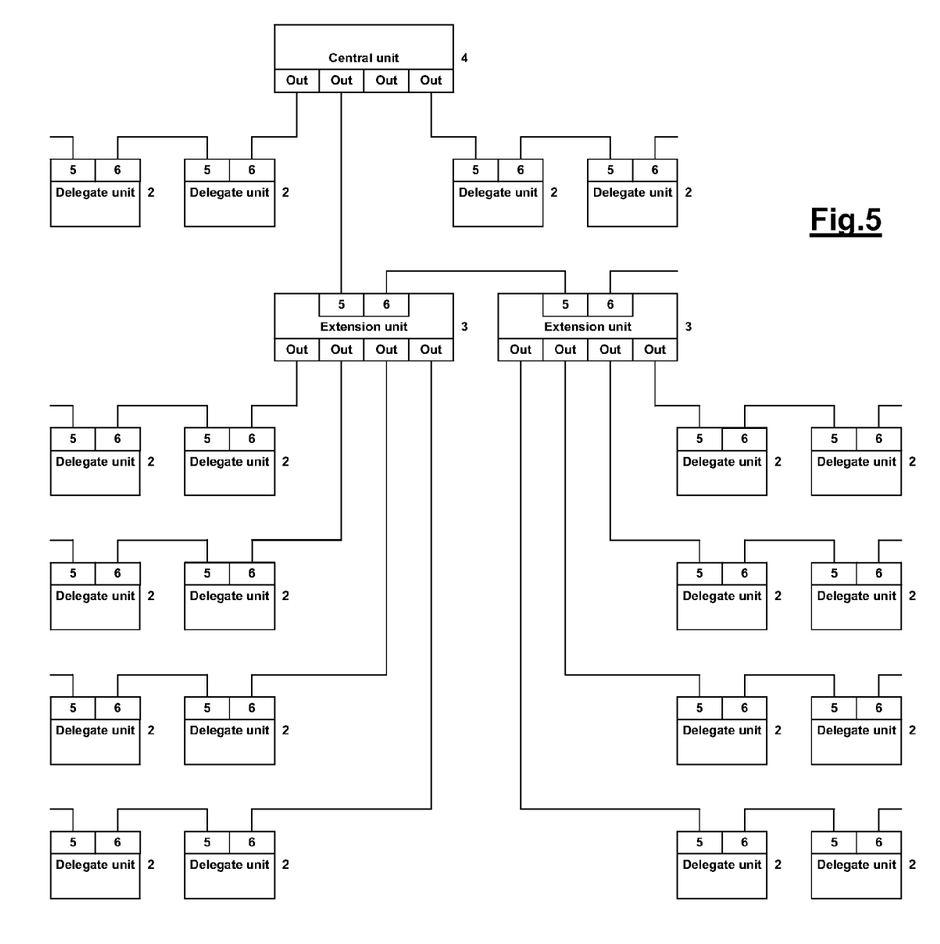
FIG. 5 illustrates a set-up of a digital conference system according to the present invention.
Figure 6:
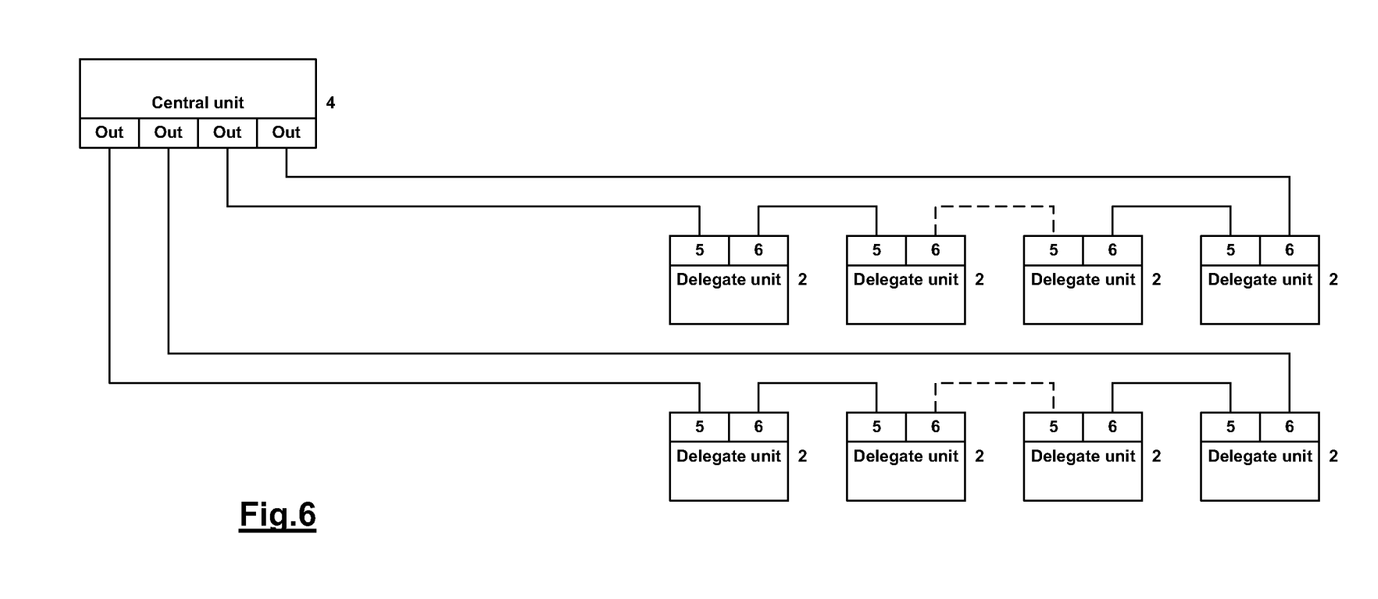
FIG. 6 illustrates a set-up of a digital conference system with cable redundancy according to the present invention.
Figure 7:
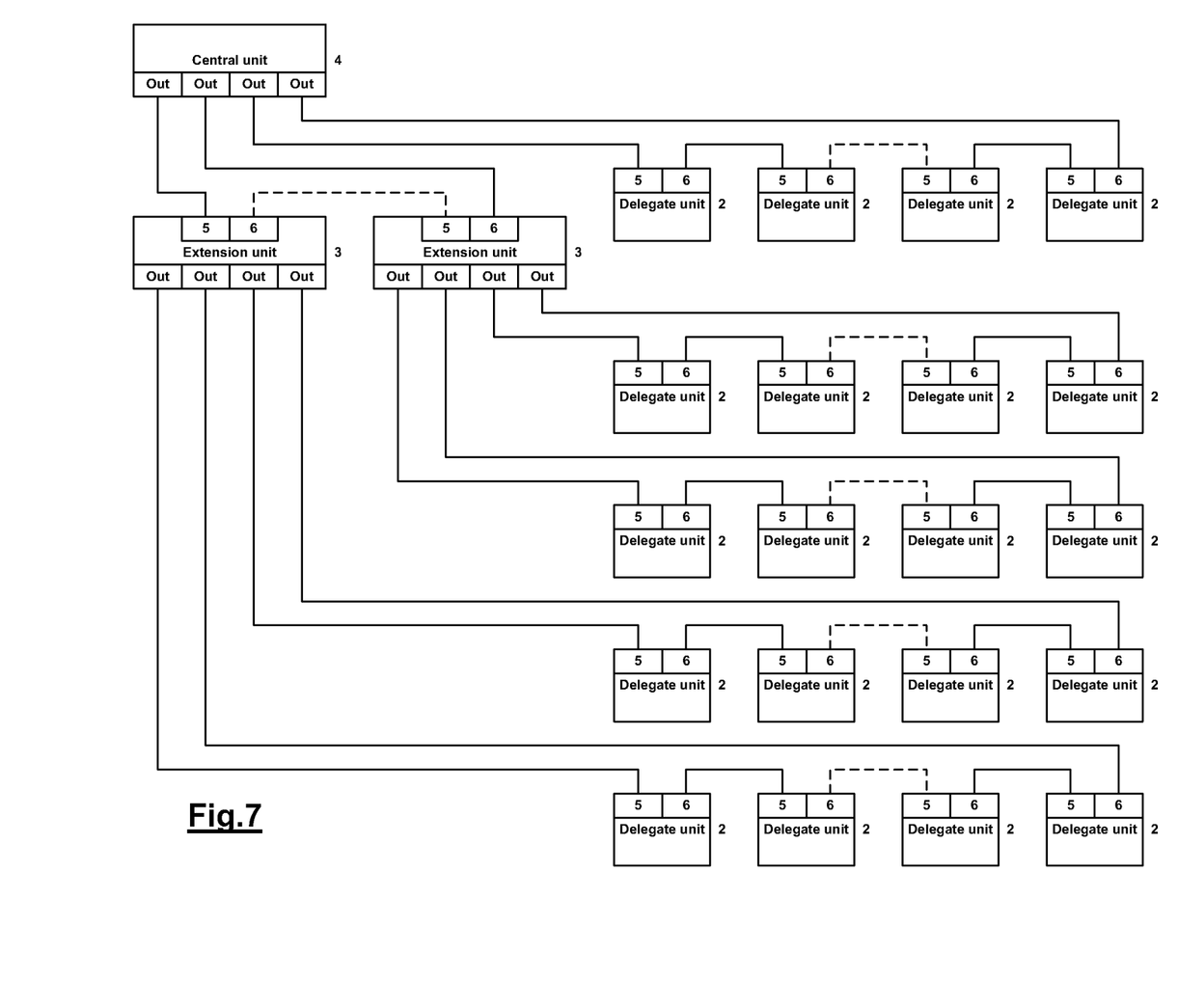
FIG. 7 illustrates an embodiment of the digital conference system of the invention equipped with extension units with cable redundancy between delegate units and extension units.
Figure 8:
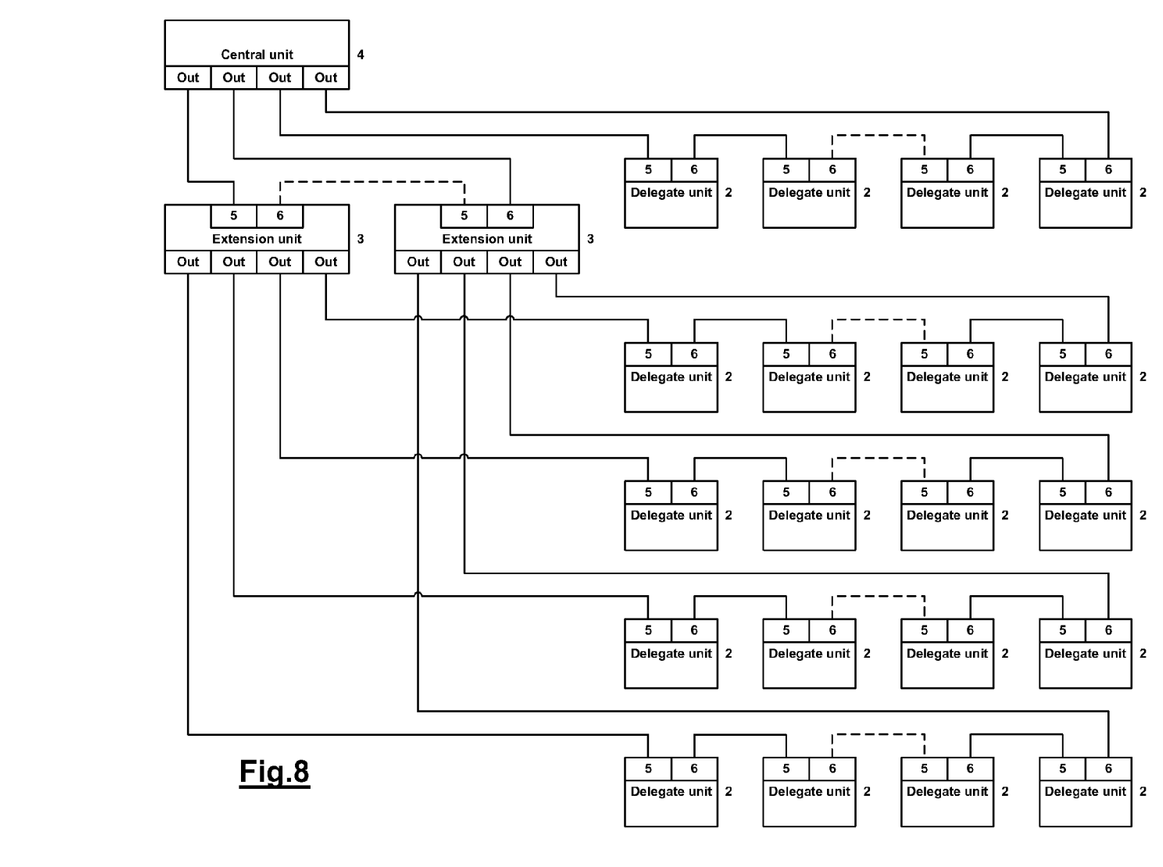
FIG. 8 illustrates an embodiment of a digital conference system of the invention equipped with extension units with cable redundancy between delegate units and extension units and extension unit redundancy.

This automatic port type detection allows changing the schematic of the current situation as depicted in FIG. 1 to the schematic of FIG. 5. The latter scheme offers as advantage that, during installation, no cabling errors between IN or OUT ports can be made and that there are no more cable crossings. The problems mentioned in the background section are thus overcome.

The resulting scheme further allows for dual branch redundancy. The automatic port type detection indeed allows for the implementation of redundancy. By connecting all the ports, the system is even more redundant than a mere ring structure. To enlarge a ring network, the network is extended by sub rings. The start and end of the ring however are always the same device. So, when this device is failing, the whole sub ring is failing. With the dual branch concept, the network does not have to be connected in a ring. Redundancy cabling means that the data has more than one way to reach the central unit. The dual branch mechanism always uses one way to reach the central unit and does not use the other way. The redundant connections in the following figures (FIGS. 6-9, further commented below) are the dashed lines.

In the dual branch concept not all cables are used, i.e. during start up the delegate units choose and select a branch in the network either connected with port 1 or port 2 of the delegate unit. So an active branch is created during startup. As a result, the cable connected to the configured OUT port of the last unit in the active branch will not be used during this session. A cable failure in the active branch dynamically changes the used branches without notice to the user. To notify the user of a cable failure in the dual branch network the following functionality can be used. The central unit can detect if the delegate unit is at the end of the used branch. So, when the central unit sends a sense command to a last delegate unit, this unit can force the OUT port to become a sensing IN port. By doing this the central unit can then ask if this last unit sees synchronization or, put in other words: "Detect the redundant path if it works". Then the central unit places this last unit into normal mode and goes to another last delegate unit. It is to be noted that only one delegate unit can be in sense mode at a time. The network change in case of a failure of a branch or device results in unnoticeable artifacts. The synchronization between all other devices remains.

Figure 9:
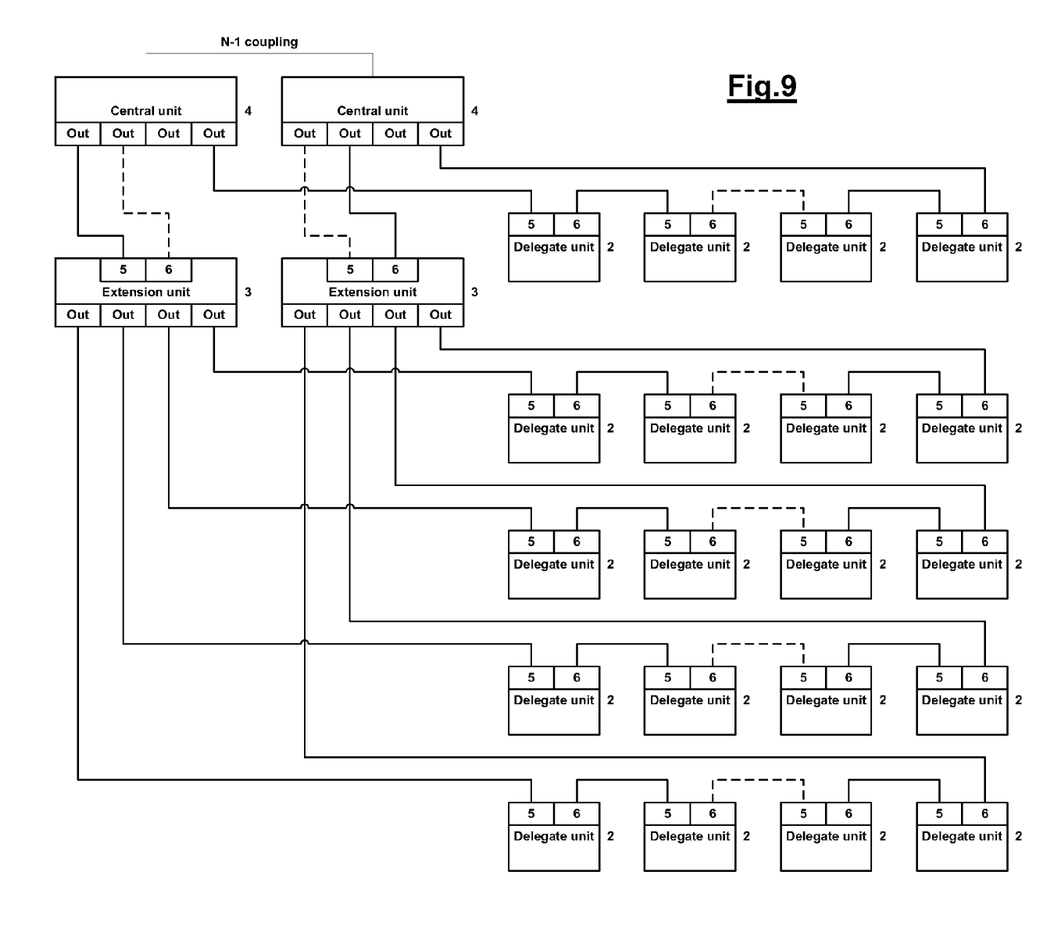
FIG. 9 illustrates an embodiment of a digital conference system of the invention equipped with extension units with cable redundancy between delegate units and extension units, extension unit redundancy and central unit redundancy.

The conference system may have several redundancy possibilities. First, there is the cable redundancy (see FIGS. 6 to 9):
  If one cable is failing, the system will work further.
  Every delegate unit in the system has two paths to go to the central unit.
By using smart cabling, the extension unit redundancy (FIGS. 8 and 9) can be achieved:
  If one cable is failing or an extension unit is failing, the system will remain operative.
  Every delegate in the system has two paths directly or through different extension units to go to the central unit
  Every extension unit may have two paths directly or through different extension units to go to the central unit.
A further option is central unit redundancy, as illustrated in FIG. 9:
  If one cable is failing or an extension unit is failing or a central unit is failing, the system will work further.
  Every delegate in the system has a path directly or through extension units to both centrals. Every extension unit has two paths to its own central unit. The central units are coupled in N–1 mode for the delegates in FIG. 9.

Figure 10:
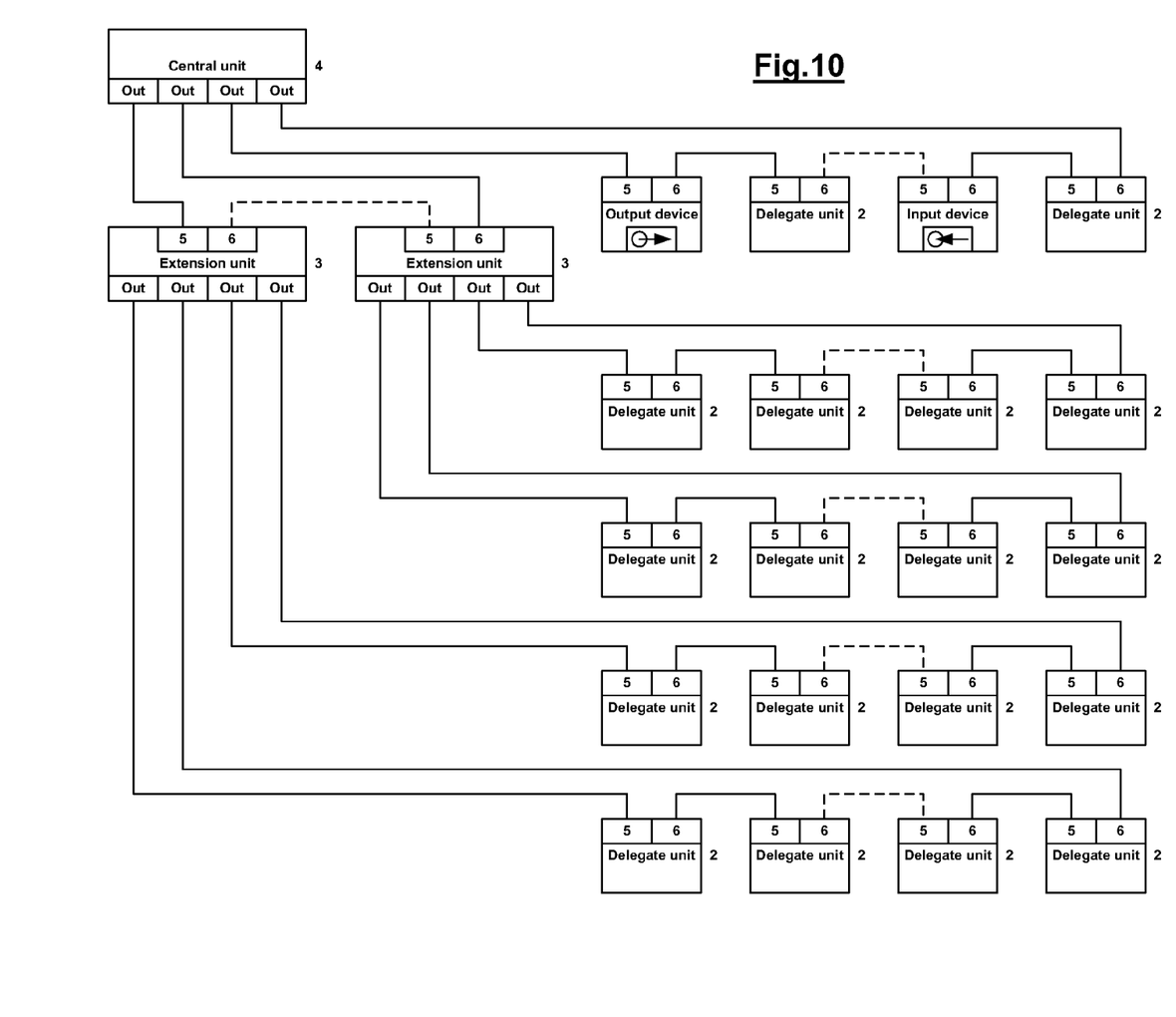
FIG. 10 illustrates an embodiment of the digital conference system of the invention equipped with extension units with cable redundancy between delegate units and extension units and other devices that can be connected to the network for extra peripheral functionality (e.g. audio input & output, . . . ).

It is to be noted that a digital conference system may also comprise delegate units, interpreter desks and network devices (like an audio input module and/or output module). These can all be implemented as devices according to the present invention. As an example, FIG. 10 illustrates a digital conference system is equipped with extension units with cable redundancy between delegate units and extension units and other devices that can be connected to the network for extra peripheral functionality (e.g. audio input & output, . . . ).

In order to further improve the digital conference system's reliability additional measures can be envisaged apart from the increased redundancy offered by the delegate units.

In another aspect the invention therefore relates to the detection of device failures in the network in nearly real-time. By providing the digital conference system with a network monitoring module according to the present invention errors can be discovered in a fast and easy way. Detected device errors can be solved by auto-replacing the defective units. The proposed unit is capable of automatically taking over the configuration settings of the defective unit. No additional configuration handling is required.

In conventional conference systems the scanning of delegate units is performed through polling over a shared control channel. As the bandwidth for scanning is limited in this channel, the polling of the delegate units can never be high. A new polling is started e.g. each 40 seconds, which often is too slow for a satisfactory performance.

To increase the polling speed, a scanning channel through the network can be used (e.g. an audio channel), so that the polling of the delegate units can be increased. Alternatively, a network monitoring unit can be employed so that the polling function of the delegate units is offloaded from the central unit.

The network monitoring unit continuously checks the various devices of the conference system, e.g. via their personal numbers. It counts all types of delegate units within one subfamily faster (e.g. multiple times in one second) than the scanning on the central unit as used in prior art systems. With subfamily is meant a part of the conference system having a same or a similar function in the system, e.g. the delegate units constitute a subfamily just as the extension units etc. . . . The central unit has to poll the monitoring unit for changes in the network. Loss of a delegate unit can then be detected within one second (instead of the above-mentioned 40 seconds). The number of delegate units within one subfamily is counted.

When a new delegate unit is inserted into the conference network, it is detected and an autoreplacement can be performed. First, the central unit detects through the network monitoring unit a loss of a delegate unit. So the system operator receives an error indication or message. The operator goes into the conference room, removes the bad unit and replaces it by a spare unit. Within one second, the central detects the spare unit and reinitializes it with the parameters of the bad unit. The system does not have to go down. The conference can go on during the replacement.

The above solution is clearly preferable over a solution as in a conventional conference system, whereby, when a loss of a delegate unit is detected, the system operator replaces the bad unit by a spare unit, but whereby the operator has to add this unit to the system. The system must be stopped, the old unit removed, new unit added and initialized, after which the system is restarted, resulting in a system downtime of several minutes.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A device for use in a digital conference system comprising a central unit, said device being arranged for exchanging audio and video signals with said central unit, said device comprising:
   a first and a second port, each port comprising two pairs of differential lines,
   a detection device having a processor configured to arrange said first and said second port in a receive mode at start-up or loss of a digital conference network and then automatically detect which of said first and said second port is an input port when said port is synchronized to the digital conference network, and
   a configuration device having a processor configured to arrange, on receipt of a trigger signal being a synchronisation signal, said detected input port as the input port of the device by configuring the two pairs of differential lines as an external differential receive pair and an internal differential transmit pair and the other port of the first and the second port as an output port of the device by configuring the two pairs of differential lines as an internal differential receive pair and an external differential transmit pair.

2. The device as in claim 1, wherein said synchronisation signal is a bit synchronisation signal.

3. The device as in claim 1, wherein said device is a delegate unit in a digital conference system.

4. The device as in claim 1, said device being an extension unit in a digital conference system.

5. A digital conference system comprising:
   a plurality of devices configured for use in the digital conference system, said devices having a processor configured to exchange audio and video signals with at least one central unit and arranged in a daisy chain topology,
   each of said devices comprising a first and a second port, each port comprising two pairs of differential lines, a detection device having a processor configured to arrange said first and said second port in a receive mode at start-up or loss of a digital conference network and then automatically detect which of said first and said second port is an input port when said port is synchronized to the digital conference network, and a configuration device having a processor configured to arrange, on receipt of a trigger signal being a synchronisation signal, said detected port as the input port of the device by configuring the two pairs of differential lines as an external differential receive pair and an internal differential transmit pair and the other port of the first and second port as an output port of the device by configuring the two pairs of differential lines as an internal differential receive pair and an external differential transmit pair; and
   the at least one central unit configured for the digital conference system.

6. The digital conference system as in claim 5, comprising a network monitoring module arranged to poll said plurality of devices.

7. The digital conference system as in claim 6, wherein said central unit is arranged to poll said network monitoring module.

8. The digital conference system as in claim 5, comprising a storage arrangement that stores configuration information.

9. A method for obtaining redundancy in a digital conference system, wherein the digital conference system comprises at least one central unit and a plurality of devices configured for use in the digital conference system and arranged in a daisy chain topology, each of said devices comprising a first and a second port, each port comprising two pairs of differential lines, a detection device having a processor configured to arrange said first and said second port in a sense mode at start-up or loss of a digital conference network and then automatically detect which of said first and said second port is the input port when said port is synchronized to the digital conference network, and a configuring device having a processor configured to arrange said detected port as the input port of the device by configuring the two pairs of differential lines as an external differential receive pair and an internal differential transmit pair and the other port of the first and the second port as the output port by configuring the two pairs of differential lines as an internal differential receive pair and an external differential transmit pair, so that each device has two paths to said at least one central unit, the method comprising the steps of:
   creating an active network branch connecting a set of devices of the digital conference system via a first path of said two paths,
   when a failure in said digital conference system is detected, making the output port of at least the device at an end of the active branch act as the input port by sending a trigger signal, said trigger signal being a synchronisation signal, and configuring the two pairs of differential lines as the external differential receive pair and the internal differential transmit pair so that a second path of said two paths becomes active.

10. A method for replacing a device comprised in a digital conference system, said digital conference system being configured as a network comprising a plurality of devices configured for use in the digital conference system and arranged in a daisy chain topology, each device comprising a first and a second port, each port comprising two pairs of differential lines, wherein said first port is configured as an input port by configuring the two pairs of differential lines as an external differential receive pair and an internal differential transmit pair and said second port as an output port by configuring the two pairs of differential lines as an internal differential receive pair and an external differential transmit pair and a central unit, said method comprising the steps of:

detecting loss of a device of said digital conference system, replacing said device by a replacement device, detecting the replacement device in the digital conference system, detecting which of said first and said second port is an input port when said port is synchronized to the digital conference network by placing said first and said second port in a receive mode, configuring with the central unit said detected replacement device with configuration settings of the lost device by using a trigger signal, said trigger signal being a synchronisation signal, wherein said detected port is configured as the input port by configuring the two pairs of differential lines as the external differential receive pair and the internal differential transmit pair and the other port of the first and the second port as the output port by configuring the two pairs of differential lines as the internal differential receive pair and the external differential transmit pair.

11. The device as in claim 1, wherein the central unit is configured to combine multiple audio channels from multiple delegate units and to distribute the received audio channels.

12. The device as in claim 11, wherein the central unit is further configured to combine multiple data channels from multiple delegate units and to distribute the received data channels.

13. The device as in claim 12, wherein the central unit is further configured to distribute combinations of the received audio channels and the received data channels.

14. The device as in claim 1, wherein the central unit is further configured to automatically select an active link on one of the first port and the second port.

15. The device as in claim 11, wherein the central unit is further configured to automatically select an active link on one of the first port and the second port.

16. The device as in claim 12, wherein the central unit is further configured to automatically select an active link on one of the first port and the second port.

17. The device as in claim 13, wherein the central unit is further configured to automatically select an active link on one of the first port and the second port.

* * * * *